United States Patent
Hiramoto et al.

(10) Patent No.: US 9,893,992 B2
(45) Date of Patent: Feb. 13, 2018

(54) COMMUNICATION APPARATUS, INFORMATION PROCESSING APPARATUS, AND METHOD OF CONTROLLING COMMUNICATION APPARATUS

(71) Applicant: FUJITSU LIMITED, Kawasaki-shi, Kanagawa (JP)

(72) Inventors: Shinya Hiramoto, Yokohama (JP); Tomohiro Inoue, Kawasaki (JP); Shun Ando, Yokohama (JP); Masahiro Maeda, Zama (JP); Masao Yoshikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 181 days.

(21) Appl. No.: 14/875,994

(22) Filed: Oct. 6, 2015

(65) Prior Publication Data

US 2016/0112312 A1 Apr. 21, 2016

(30) Foreign Application Priority Data

Oct. 15, 2014 (JP) .................. 2014-211242

(51) Int. Cl.
*H04L 12/26* (2006.01)
*H04L 12/741* (2013.01)
*H04L 12/861* (2013.01)

(52) U.S. Cl.
CPC .......... *H04L 45/74* (2013.01); *H04L 49/9005* (2013.01)

(58) Field of Classification Search
CPC ............................ H04L 45/74; H04L 49/9005
USPC ...... 370/229–236.2, 252–253, 419–420, 463
See application file for complete search history.

(56) References Cited

U.S. PATENT DOCUMENTS

| 6,122,280 | A | * | 9/2000 | Hamai | H04L 12/40058 370/389 |
| 6,252,849 | B1 | | 6/2001 | Rom et al. | |
| 6,396,814 | B1 | * | 5/2002 | Iwamura | H04L 12/185 370/230 |
| 6,850,489 | B1 | * | 2/2005 | Omi | H04L 1/0061 370/230 |
| 9,014,029 | B1 | * | 4/2015 | Dawson | H04L 43/0858 370/252 |
| 2004/0235507 | A1 | * | 11/2004 | Amino | H04J 3/0632 455/502 |

(Continued)

FOREIGN PATENT DOCUMENTS

| JP | 9-270821 | 10/1997 |
| JP | 2002-519912 | 7/2002 |

*Primary Examiner* — Thai Hoang
(74) *Attorney, Agent, or Firm* — Staas & Halsey LLP

(57) ABSTRACT

A communication apparatus includes a connection port and a processor. The connection port is connected to a switch apparatus. The processor is configured to acquire data to be transmitted to an external apparatus. The processor is configured to generate a packet destined to the external apparatus. The packet contains the data. The processor is configured to store the packet in a buffer. The processor is configured to acquire the packet from the buffer. The processor is configured to transmit the packet to the switch apparatus via the connection port. The processor is configured to acquire a state of a network to which the connection port is connected. The processor is configured to control, on basis of the state of the network and a predetermined packet generation time, a number of packets to be generated.

7 Claims, 9 Drawing Sheets

(56) References Cited

U.S. PATENT DOCUMENTS

| | | | |
|---|---|---|---|
| 2005/0030967 A1* | 2/2005 | Ohmi | H04W 74/0808 370/445 |
| 2010/0322187 A1* | 12/2010 | Tani | H04L 1/0007 370/331 |
| 2013/0170388 A1* | 7/2013 | Ito | H04J 3/0667 370/252 |
| 2014/0078915 A1* | 3/2014 | Edsall | H04L 43/08 370/252 |
| 2015/0049627 A1* | 2/2015 | Ito | H04L 43/0864 370/252 |

* cited by examiner

COMMUNICATION APPARATUS, INFORMATION PROCESSING APPARATUS, AND METHOD OF CONTROLLING COMMUNICATION APPARATUS

CROSS-REFERENCE TO RELATED APPLICATION

This application is based upon and claims the benefit of priority from the prior Japanese Patent Application No. 2014-211242, filed on Oct. 15, 2014, the entire contents of which are incorporated herein by reference.

FIELD

The embodiments discussed herein are related to a communication apparatus, an information processing apparatus, and a method of controlling a communication apparatus.

BACKGROUND

As information processing is advanced and becomes complex in recent years, an information processing system that allows communications between a plurality of arithmetic processing units to execute processing tends to increase. For example, a parallel computer includes nodes performing computation and switches forming networks of the nodes.

In such a parallel computer, when communication is performed between the nodes, a node divides a message into packets and transmits the packets to a switch connected to the node. When a switch receives a packet via an input port to which a node or another switch is connected, the switch determines a destination port on the basis of a destination of the packet and transmits the packet using the determined destination port.

When a plurality of packets received via respective input ports are to be transmitted to the same destination port, the switch performs arbitration for the packets and transmits the packets in an order based on the arbitration result. The switch includes a buffer for each destination port and holds the packet stacked by the arbitration in the buffer.

For example, a case is considered where a first node to a fourth node are arranged in series through switches. In this case, the switches are connected through the ports with one another to form a path which bypasses the nodes. In a case where the first node transmits packets to the fourth node, a network interface of the first node sequentially generates packets destined to the fourth node and stores the packets in a transmission buffer. This is because if a subsequent packet is not generated even when a transmission of a preceding packet is completed and the subsequent packet may be transmitted, the subsequent packet is unable to be immediately transmitted and thus throughput is reduced.

A related technique is suggested in which in order to suppress a reduction of the throughput, a notification is sent to a transmission side apparatus to suppress a transmission rate in a case where a switch or a reception side apparatus becomes congested. Further, a related technique is suggested in which a packet is prohibited from being transmitted from a transmission apparatus when a quantity of data accumulated in a buffer of a switch exceeds a threshold value.

Related techniques are disclosed in, for example, Japanese Laid-Open Patent Publication No. 09-270821 and Japanese National Publication of International Patent Application No. 2002-519912.

The subsequent packet becomes transmittable depending on a state of a network. When it takes time until the subsequent packet becomes transmittable, an influence may be exerted on communications to other nodes.

A case is considered where, in addition to the first node, the second node and the third node also transmit packets to the fourth node in the example of the information processing system including the first node to the fourth node as described above. In this case, since the packets from a plurality of transmission sources are simultaneously transmitted to the fourth node as the same destination, arbitration is performed on each switch located on the path, and transmission of some packets may be suspended. The suspended packets are stored in the buffers. When the suspended term becomes longer, the packets stored in the buffer are gradually increased. When a buffer of a switch is saturated, the transmitted packets are accumulated in a buffer of another switch located on the path, and the number of switches having saturated buffers is increased gradually on the path. Finally, even the switch connected to the first node, which is a transmission source, is saturated and packets to be transmitted by the first node are not allowed to be transmitted until an available space is created in the buffer of the switch to which the first node is connected. As described above, a situation where the switch connected to a destination port of packets becomes saturated is referred to as a "clogging of destination port" in the following description. When the first node attempts to transmit packets to another node in a state where the destination port is clogged, the transmission buffer of the network interface of the first node is saturated and a sufficient space is not available, such that the packets destined to the another node are not generated. Therefore, there is a possibility that the throughput of the first node is reduced.

As described above, in the conventional information processing system, it is difficult to reduce degradation in performance caused by the clogging of the destination port.

It may be considered that a transmission buffer may be provided for each destination port in the network interface, but the amount of desired materials is increased as the number of destination ports is increased and it is difficult to provide a transmission buffer for each destination port from the viewpoint of, for example, an increase of manufacturing cost or an increase of a mounting area.

In the conventional technique in which the notification is sent to the transmission side apparatus to reduce the transmission rate in a case of being congested, it is difficult to reduce degradation in performance of the system due to the reduction of the transmission rate. In the conventional technique in which the packet is prohibited from being transmitted from the transmission apparatus in a case where the quantity of data accumulated in the buffer exceeds the threshold value, it is difficult to reduce the degradation in performance of the system since the packet transmission is stopped.

SUMMARY

According to an aspect of the present invention, provided is a communication apparatus including a connection port and a processor. The connection port is connected to a switch apparatus. The processor is configured to acquire data to be transmitted to an external apparatus. The processor is configured to generate a packet destined to the external apparatus. The packet contains the data. The processor is configured to store the packet in a buffer. The processor is configured to acquire the packet from the buffer. The processor is configured to transmit the packet to the switch apparatus via the connection port. The processor is configured to acquire a state of a network to which the connection port is connected. The processor is configured to control, on basis of the state of the network and a predetermined packet generation time, a number of packets to be generated.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, descriptions will be made in detail on embodiments of a communication apparatus, an information processing apparatus, and a method of controlling a communication apparatus with reference to the accompanying drawings. The communication apparatus, the information processing apparatus, and the method of controlling the communication apparatus are not limited to the embodiments to be described below.

First Embodiment

Figure 1:
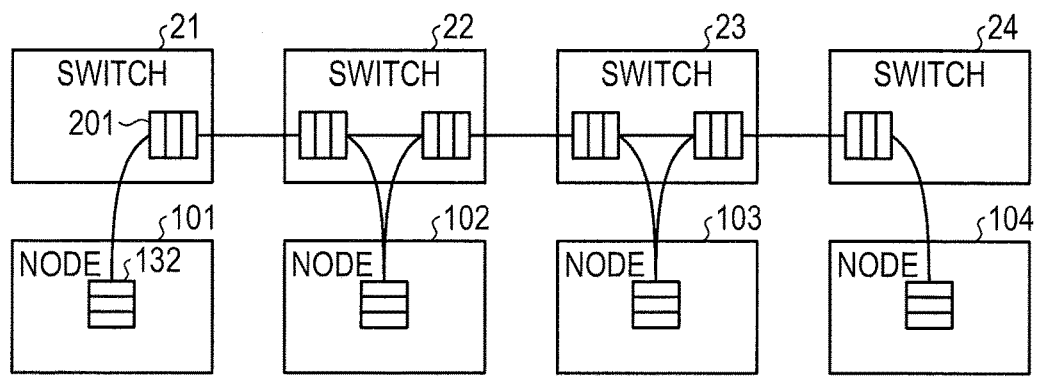
FIG. 1 is a diagram illustrating an exemplary configuration of an information processing system.

FIG. 1 is a diagram illustrating an exemplary configuration of an information processing system. As illustrated in FIG. 1, the information processing system includes a plurality of nodes 101 to 104 that are information processing apparatuses. In the following, when it is not intended to distinguish the respective nodes 101 to 104, each node may be referred to as a "node 10". Further, the information processing system includes a plurality of switches 21 to 24. In the following, when it is not intended to distinguish the respective switches 21 to 24, each switch may be referred to as a "switch 20".

The node 101 is connected to the switch 21, the node 102 is connected to the switch 22, the node 103 is connected to the switch 23, and the node 104 is connected to the switch 24. The switches 21 to 24 are connected in series. That is, the nodes 101 to 104 are linearly arranged to form a one-dimensional mesh network topology. Here, in the present embodiment, for the convenience of explanation, the one-dimensional mesh network topology is described by way of an example, but the network topology is not particularly limited, and a one-dimensional torus, two-dimensional mesh or torus network topology, or three-dimensional mesh or torus network topology may be employed.

Each node 10 includes a port for being connected to a corresponding switch 20. The port of each node 10 includes a packet storage unit 132. The packet storage unit 132 is a transmission buffer.

Each switch 20 includes a port for being connected to a corresponding node 10 and ports for being connected to other switches 20. Each port of each switch 20 includes a buffer 201.

For example, when the node 101 sends a message to the node 104, the node 101 divides the message to generate packets and transmits the generated packets to the node 104 via the switches 21 to 24. When there is no available space in the buffer 201 of the port of the switch 21, which is connected to the switch 22, the node 101 stores the packets in the packet storage unit 132 until a transmission permission for the packets is received from the switch 21. When the transmission permission for the packet is received from the switch 21, the node 101 outputs the packets stored in the packet storage unit 132 to the switch 21.

Figure 2:
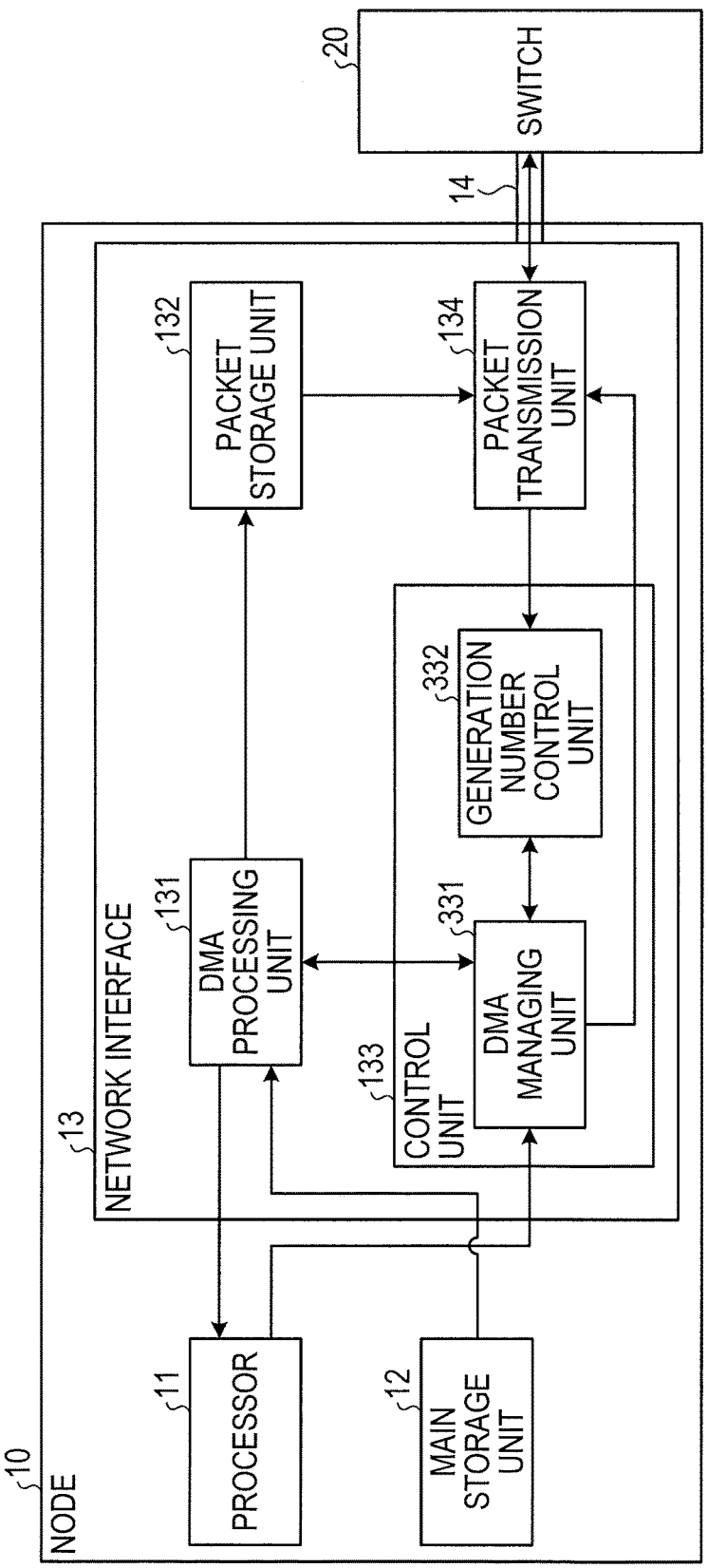
FIG. 2 is a diagram illustrating an information processing apparatus according to a first embodiment.

Next, descriptions will be made on details of the information processing apparatus according to the present embodiment with reference to FIG. 2. FIG. 2 is a diagram illustrating an information processing apparatus according to first embodiment.

The node 10 includes a processor 11, a main storage unit 12, a network interface 13 which is a communication apparatus, and a port 14. The processor 11, the main storage unit 12, and the network interface 13 are connected with one another by a bus. The port 14 may be regarded as a portion of the network interface 13.

The processor 11 is an arithmetic processing unit. The processor 11 receives a direct memory access (DMA) request from the network interface 13. The processor 11 transmits an address at which the data is stored to the network interface 13. The processor 11 transmits a permission to use the bus and a message transmission request to the network interface 13. Then, the processor 11 releases the bus.

When a DMA completion notification is received from the network interface 13, the processor 11 regains a right to use the bus.

The main storage unit 12 is divided into storage areas and each storage area is assigned with an address. The main storage unit 12 stores data in the storage area corresponding to each address.

Next, descriptions will be made on the network interface 13. The network interface 13 includes a DMA processing unit 131, the packet storage unit 132, a control unit 133, and a packet transmission unit 134 as illustrated in FIG. 2. The network interface 13 is connected with the switch 20 through the port 14.

The DMA processing unit 131 transmits a DMA request together with information of data to be transferred by DMA to the processor 11. Thereafter, the DMA processing unit 131 receives, from a DMA managing unit 331 (described below), an address and a data length of data to be stored in each packet for transmitting the data. The data is divided for a plurality of packets to be transmitted. In the following, a topmost packet among the packets in which the data is stored is referred to as a "leading packet" and other packets succeeding to the leading packet are referred to as "subsequent packets".

The DMA processing unit 131 sequentially acquires data which amounts to the data length, from the main storage unit 12 starting from the address received from the DMA managing unit 331. The DMA processing unit 131 generates a packet containing the acquired data. Thereafter, the DMA processing unit 131 transmits the generated packet to the packet storage unit 132.

The DMA processing unit 131 generates a packet on the basis of a sequentially designated address and a data length and stores the packet in the packet storage unit 132, as long as a start address and a data length of data to be stored in a packet are sent from the DMA managing unit 331.

When a DMA end notification is received from the DMA managing unit 331, the DMA processing unit 131 transmits the DMA completion notification to the processor 11. The DMA processing unit 131 corresponds to an example of a "generation unit".

The packet storage unit 132 sequentially stores and accumulates the packets transmitted from the DMA processing unit 131. The packet storage unit 132 corresponds to an example of a "storage unit".

The control unit 133 controls DMA processing executed by the DMA processing unit 131. The control unit 133 includes the DMA managing unit 331 and a generation number control unit 332.

The DMA managing unit 331 receives the address of the data to be transferred by DMA together with the message transmission request from the processor 11. The DMA managing unit 331 obtains a top address and a data length of data to be stored in each packet in order to divide the data to be transferred by DMA into small-sized data that may be stored in each packet.

Next, the DMA managing unit 331 determines whether an instruction to limit the number of packets to be generated to N packets is received from the generation number control unit 332.

When it is determined that the instruction to limit the number of packets to be generated is not received, the DMA managing unit 331 sequentially transmits each of top addresses and data lengths of data to be stored in each of the leading packet and all the subsequent packets succeeding to the leading packet to the DMA processing unit 131.

In contrast, when the instruction to limit the number of packets to be generated to N packets is received, the DMA managing unit 331 sequentially transmits each of top addresses and data lengths of data to be stored in each of the leading packet and the subsequent packets succeeding to the leading packet to the DMA processing unit 131. When the number of packets stored in the packet storage unit 132 becomes N packets, the DMA managing unit 331 temporarily stops the transmission of an address and a data length to the DMA processing unit 131. Thereafter, when the number of packets stored in the packet storage unit 132 becomes less than N packets, the DMA managing unit 331 sequentially sends an address and a data length to the DMA processing unit 131 such that the number of packets stored in the packet storage unit 132 becomes N packets. As described above, a state where the DMA processing unit 131 is allowed to generate the packets such that the number of packets stored in the DMA processing unit 131 becomes the N packets is referred to as a "state where the number of packets to be generated is limited".

When a notification of cancelling the limitation is received from the generation number control unit 332 in the state where the number of packets to be generated is limited, the DMA managing unit 331 transmits a top address and a data length of remaining data to be stored in the respective packets to the DMA processing unit 131 without limiting the number of packets to be generated. When the instruction to limit the number of packets to be generated to N packets is received from the generation number control unit 332 again, the DMA managing unit 331 returns to the state where the number of packets to be generated is limited.

When generation of the leading packet is completed, the DMA managing unit 331 receives a generation completion notification of the leading packet from the DMA processing unit 131. When the generation completion notification of the leading packet is received, the DMA managing unit 331 transmits, to the packet transmission unit 134, an instruction to transmit the leading packet. Further, the DMA managing unit 331 notifies the generation number control unit 332 of the output of the instruction to transmit the leading packet.

With regard to the subsequent packets, the DMA managing unit 331 transmits, to the packet transmission unit 134, an instruction to transmit a packet, at the timing when an address and a data length are transmitted to the DMA processing unit 131. Further, the DMA managing unit 331 notifies the generation number control unit 332 of the output of the instruction to transmit the packet.

The DMA managing unit 331 determines whether generation of all the packets for transmitting the data to be transferred by DMA is completed. When it is determined that the generation of all the packets is not completed, the DMA managing unit 331 continues to transmit an address and a data length. When it is determined that the generation of all the packets is completed, the DMA managing unit 331 transmits the DMA end notification to the DMA processing unit 131.

The generation number control unit 332 stores therein a "packet generation time" which is a time taken for packet generation, in advance. For example, the packet generation time may be obtained as follows. It is assumed that a "latency for storing a packet" is defined as a period of time between a timing at which the DMA processing unit 131 requests the main storage unit 12 for data and a timing at which a packet containing the requested data is stored in the packet storage unit 132. Further, it is assumed that a "data transfer time" is defined as a value obtained by dividing a data length by a bandwidth between the main storage unit 12 and the network interface 13. The latency for storing a packet and the data transfer time may be acquired from a specification or obtained by measuring a time actually taken for generating a packet. In this case, the packet generation time is obtained as a value obtained by adding the latency for storing a packet and the data transfer time.

The generation number control unit 332 receives, from the DMA managing unit 331, the notification of the output of the instruction to transmit a packet. Thereafter, the generation number control unit 332 receives, from the packet transmission unit 134, a transmission permission corresponding to the instruction to transmit the packet. The generation number control unit 332 calculates a "transmission permission time" which is a period of time between a timing at which the instruction to transmit a packet is output and a timing at which the transmission permission is received. For example, the generation number control unit 332 calculates the transmission permission time by subtracting a timing at which the instruction to transmit a packet is output from the DMA managing unit 331 from a timing at which the transmission permission is received. The transmission permission time corresponds to an example of a "state of a network".

Next, the generation number control unit 332 compares the transmission permission time with the packet generation time. When the transmission permission time is longer than the packet generation time, the generation number control unit 332 notifies the DMA managing unit 331 of the fact that the number of packets to be generated is to be limited to N packets.

When the transmission permission time becomes shorter than the packet generation time in a state where the number of packets to be generated is limited, the generation number control unit 332 determines whether a transmission cancellation is received from the packet transmission unit 134. When it is determined that the transmission cancellation is received, the generation number control unit 332 notifies the DMA managing unit 331 of the fact that the limitation on the number of packets to be generated is cancelled. In contrast, when the transmission cancellation is not received, the generation number control unit 332 maintains the state where the number of packets to be generated is limited to N packets. This is because when the instruction to transmit the packet is not cancelled, no packet to be transmitted is generated. In this case, it is considered that a large number of packets may be stored in the packet storage unit 132. Therefore, even if the transmission permission time is shorter than the packet generation time, when the limitation on the number of packets to be generated is cancelled to generate packets without the limitation, the generated packets are likely to be accumulated in the packet storage unit 132. Accordingly, when the transmission cancellation is received, that is, when the packet generation does not follow the packet transmission, the generation number control unit 332 cancels the limitation on the number of packets to be generated.

Here, descriptions will be made on a determination method of the number of packets N for a case where the number of packets to be generated is to be limited. In order to prevent a reduction of throughput, the N may be set as, for example, N=packet generation time/(packet transmission time+shortest time taken until transmission permission is turned back). Here, the packet transmission time refers to a period of time between a timing at which the transmission permission is received and a timing at which the packet transmission to the switch 20 is completed. The shortest time taken until transmission permission is turned back refers to the shortest period of time between a timing at which after the DMA managing unit 331 outputs the instruction to transmit the packet to the packet transmission unit 134 and a timing at which the generation number control unit 332 receives the transmission permission from the packet transmission unit 134. That is, it may be considered that a time obtained by adding the shortest time taken until the transmission permission is turned back to the packet transmission time corresponds to the shortest time taken until the next packet is sent.

When the shortest time taken until the next packet is sent is identical with the packet generation time, since the subsequent packet may be generated after the packet transmission is started, the number of subsequent packets to be generated becomes at most 1 in order to reduce the throughput. In this case, the N may be set to 1 (one), that is, N=1.

Figure 3:
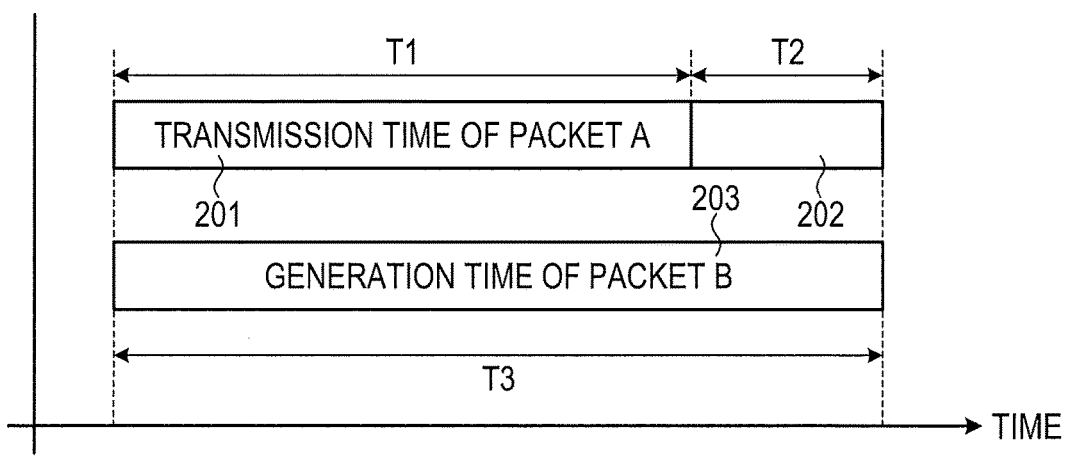
FIG. 3 is a diagram explaining packet generation and packet transmission for a case of N=1.

FIG. 3 is a diagram explaining packet generation and packet transmission for a case of N=1. In FIG. 3, the horizontal axis represents a lapse of time. Here, descriptions will be made on a case where processing is performed for a packet A and a packet B. A time period 201 is a transmission time for the packet A, a time period 202 is a transmission permission time for the packet B, and a time period 203 is a generation time of the packet B. In a case of N=1, time T3=time T1+time T2. That is, at the timing at which the transmission permission for the packet B is received, the packet B is already generated and the network interface 13 is in a state capable of immediately transmitting the packet B. Accordingly, the network interface 13 may prevent the reduction of the throughput.

However, when the time taken for the packet generation is twice the shortest time taken until the next packet is sent, at least two packets may be generated for the number of subsequent packets needed to be generated. That is, the N may be set to 2 (two), that is, N=2. In this case, when the N is set to 1, that is, N=1, a period of time during which the packet is not transmitted occurs and reduction of the throughput is caused.

Figure 4:
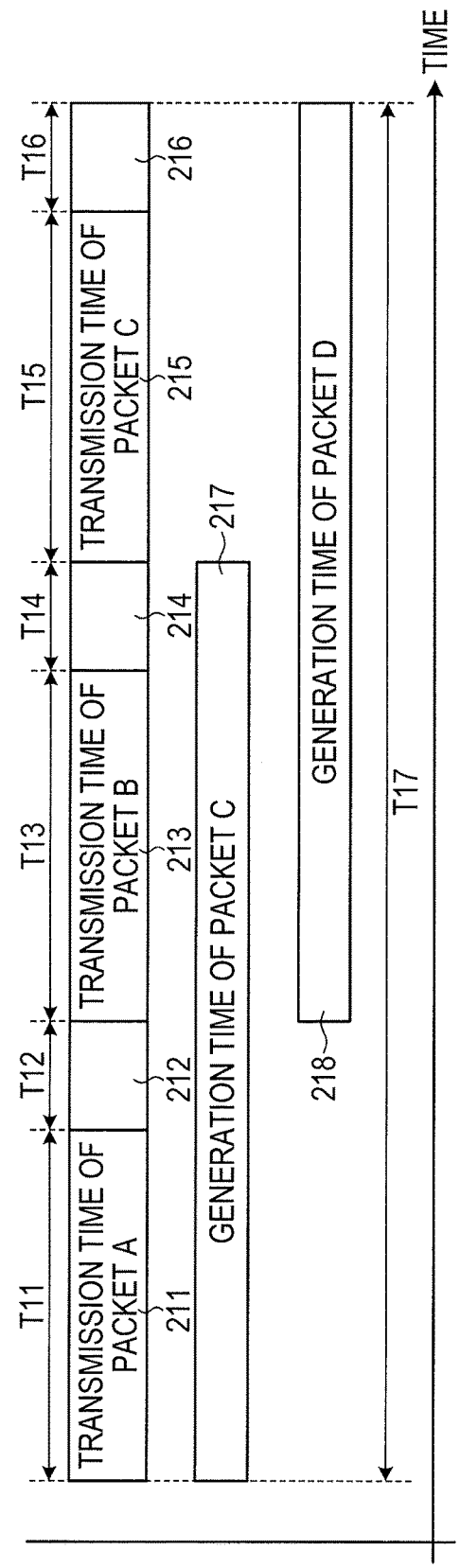
FIG. 4 is a diagram explaining packet generation and packet transmission for a case of N=2.

FIG. 4 is a diagram explaining packet generation and packet transmission for a case of N=2. In FIG. 4, the horizontal axis represents a lapse of time. Here, descriptions will be made on a case where processing is performed for packets A to D. A time period 211 is a transmission time of the packet A and a time period 212 is a transmission permission time for the packet B. A time period 213 is a transmission time of the packet B and a time period 214 is a transmission permission time for the packet C. Further, a time period 215 is a transmission time of the packet C and a time period 216 is a transmission permission time for the packet D. A time period 217 is a generation time of the packet C and a time period 218 is a generation time for the packet D. Here, descriptions will be made on a case where generation of two packets of the packets A and B is completed before the time period 211 and time period 217 begin.

In a case of N=2, the time taken until three packets are transmitted and the transmission permission for the subsequent packet is received is identical with the time taken for generating two packets. That is, time T17=time T11+time T12+time T13+time T14+time T15+time T16. Accordingly, at the timing at which the transmission permission for the packet C is received, the packet C is already generated and the network interface 13 is in a state capable of immediately transmitting the packet C. Further, at the timing at which the transmission permission for the packet D is received, the packet D is already generated and the network interface 13 is in a state capable of immediately transmitting the packet D. Accordingly, the network interface 13 may prevent reduction of the throughput.

Alternatively, the number of packets N may be determined by using the number of ports connected to the switch 20 such that N=(buffer size/(packet size×number of ports)).

The packet transmission unit 134 receives the instruction to transmit a packet from the DMA managing unit 331. The packet transmission unit 134 transmits a packet transmission request for a designated packet to a destination port of the switch 20 via the port 14. When a transmission permission is received from the destination port of the switch 20, the packet transmission unit 134 transmits the transmission permission to the generation number control unit 332. Further, the packet transmission unit 134 determines whether the packet corresponding to the received transmission permission is present in the packet storage unit 132.

When it is determined that the packet is present in the packet storage unit 132, the packet transmission unit 134 transmits the corresponding packet to the destination port of the switch 20 via the port 14.

In contrast, when it is determined that the packet corresponding to the received transmission permission is not present in the packet storage unit 132, the packet transmission unit 134 transmits a transmission cancellation to the switch 20. Further, the packet transmission unit 134 also transmits the transmission cancellation to the generation number control unit 332. The packet transmission unit 134 corresponds to an example of a "transmission unit".

The switch 20 receives the packet transmission request from the packet transmission unit 134. The switch 20 determines whether there is an available space in the buffer 201 (see FIG. 1) of the destination port designated by the packet transmission request. When it is determined that there is an available space in the buffer 201, the switch 20 transmits the transmission permission to the packet transmission unit 134.

In contrast, when it is determined that there is no available space in the buffer 201, the switch 20 waits until an available space is created in the buffer 201 of the destination port. When the available space is created, the switch 20 transmits the transmission permission to the packet transmission unit 134.

Figure 5:
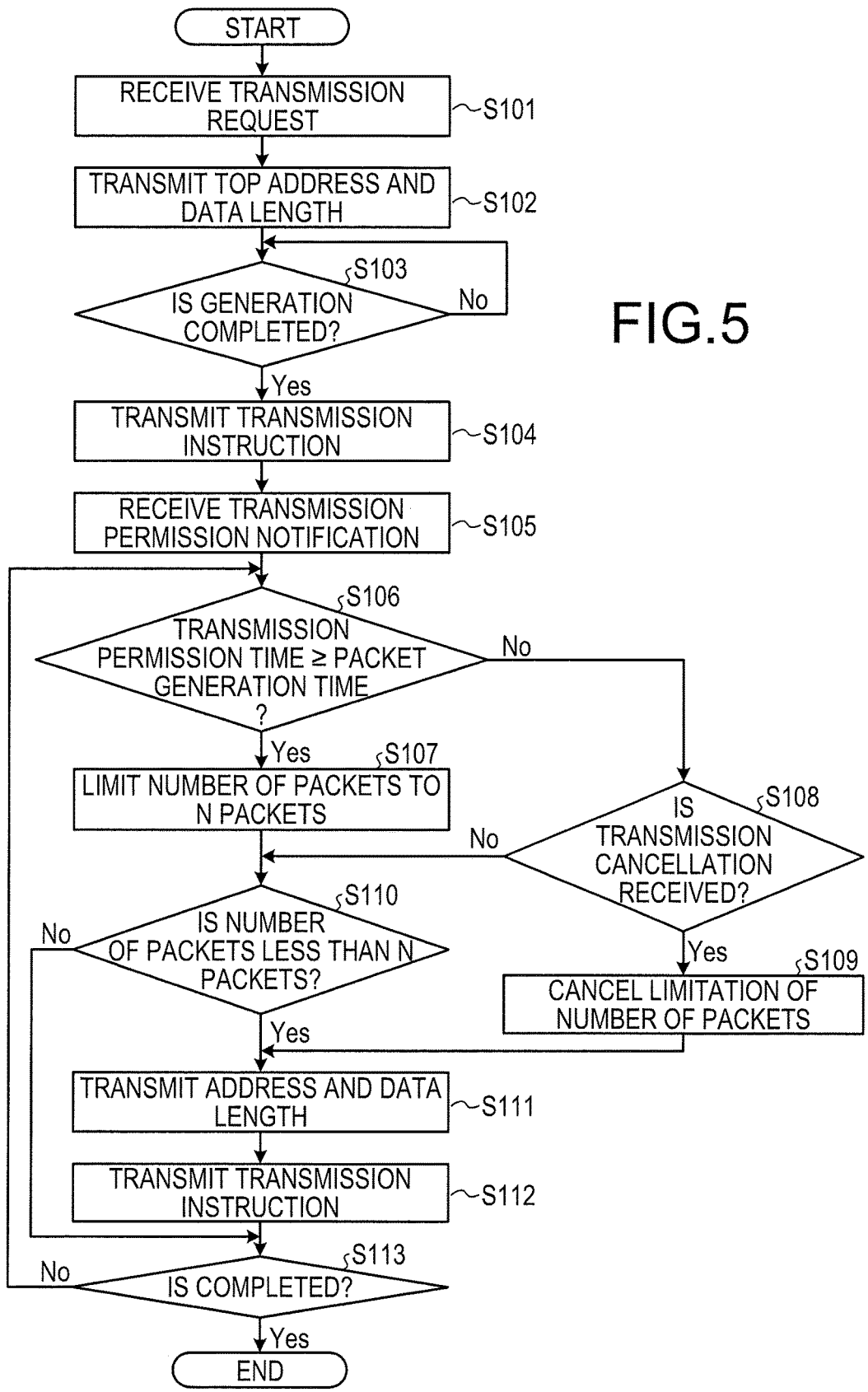
FIG. 5 is a flowchart of a control process of packet generation by a network interface according to a first embodiment.

Next, descriptions will be made on a control flow of the packet generation by the network interface 13 according to the present embodiment with reference to FIG. 5. FIG. 5 is a flowchart of a control process of the packet generation by a network interface according to the first embodiment.

The DMA managing unit 331 receives a message transmission request from the processor 11 (S101). The DMA managing unit 331 calculates top addresses and data lengths of data to be stored in the leading packet and each of the subsequent packets succeeding to the leading packet in order to divide the data designated by the message transmission request into small-sized data that may be stored in each packet.

Next, the DMA managing unit 331 transmits the top address and data length of the data to be contained in the leading packet to the DMA processing unit 131 (S102).

The DMA managing unit 331 determines whether the generation of the leading packet is completed by a notification sent from the DMA processing unit 131 (S103). When it is determined that the generation of the leading packet is not completed ("NO" at S103), the DMA managing unit 331 waits until the generation of the leading packet is completed.

In contrast, when it is determined that the generation of the leading packet is completed ("YES" at S103), the DMA managing unit 331 transmits a transmission instruction to transmit the leading packet to the packet transmission unit 134 (S104). Further, the DMA managing unit 331 notifies the generation number control unit 332 of the output of the transmission instruction.

Thereafter, the generation number control unit 332 receives, from the packet transmission unit 134, a notification of transmission permission corresponding to the transmission instruction (S105).

Next, the generation number control unit 332 calculates a transmission permission time. The generation number control unit 332 determines whether the calculated transmission permission time is equal to or greater than a predetermined packet generation time (S106). When it is determined that the transmission permission time is equal to or greater than the packet generation time ("YES" at S106), the generation number control unit 332 notifies the DMA managing unit 331 of the fact that the number of packets to be generated is to be limited to N packets. The DMA managing unit 331 receives the notification and limits the number of packets to be generated to N packets (S107).

In contrast, when it is determined that the transmission permission time is less than the packet generation time ("NO" at S106), the generation number control unit 332 determines whether a transmission cancellation is received from the packet transmission unit 134 (S108). When it is determined that the transmission cancellation is not received ("NO" at S108), the packet generation process proceeds to S110.

In contrast, when it is determined that the transmission cancellation is received ("YES" at S108), the generation number control unit 332 notifies the DMA managing unit 331 of the cancellation of the limitation. The DMA managing unit 331 receives the notification and cancels the limitation on the number of packets to be generated (S109). Thereafter, the packet generation process proceeds to S111.

The DMA managing unit 331 determines whether the number of packets being generated is less than the N packets (S110). When it is determined that the number of packets being generated is the N packets ("NO" at S110), the processing performed by the DMA managing unit 331 proceeds to S113.

In contrast, when it is determined that the number of packets being generated is less than the N packets ("YES" at S110), the DMA managing unit 331 transmits an address and a data length of the data to be contained in the subsequent packet to the DMA processing unit 131 (S111).

Next, the DMA managing unit 331 transmits, to the packet transmission unit 134, a transmission instruction to transmit the subsequent packet (S112). Further, the DMA managing unit 331 notifies the generation number control unit 332 of the output of the transmission instruction.

The DMA managing unit 331 determines whether transmission instructions for all the packets are transmitted to the packet transmission unit 134 (S113). When it is determined that a packet for which a transmission instruction is not made remains ("NO" at S113), the packet generation process goes back to S106. In contrast, when it is determined that transmission instructions for all the packets are transmitted ("YES" at S113), the DMA managing unit 331 ends the packet generation process.

Figure 6:
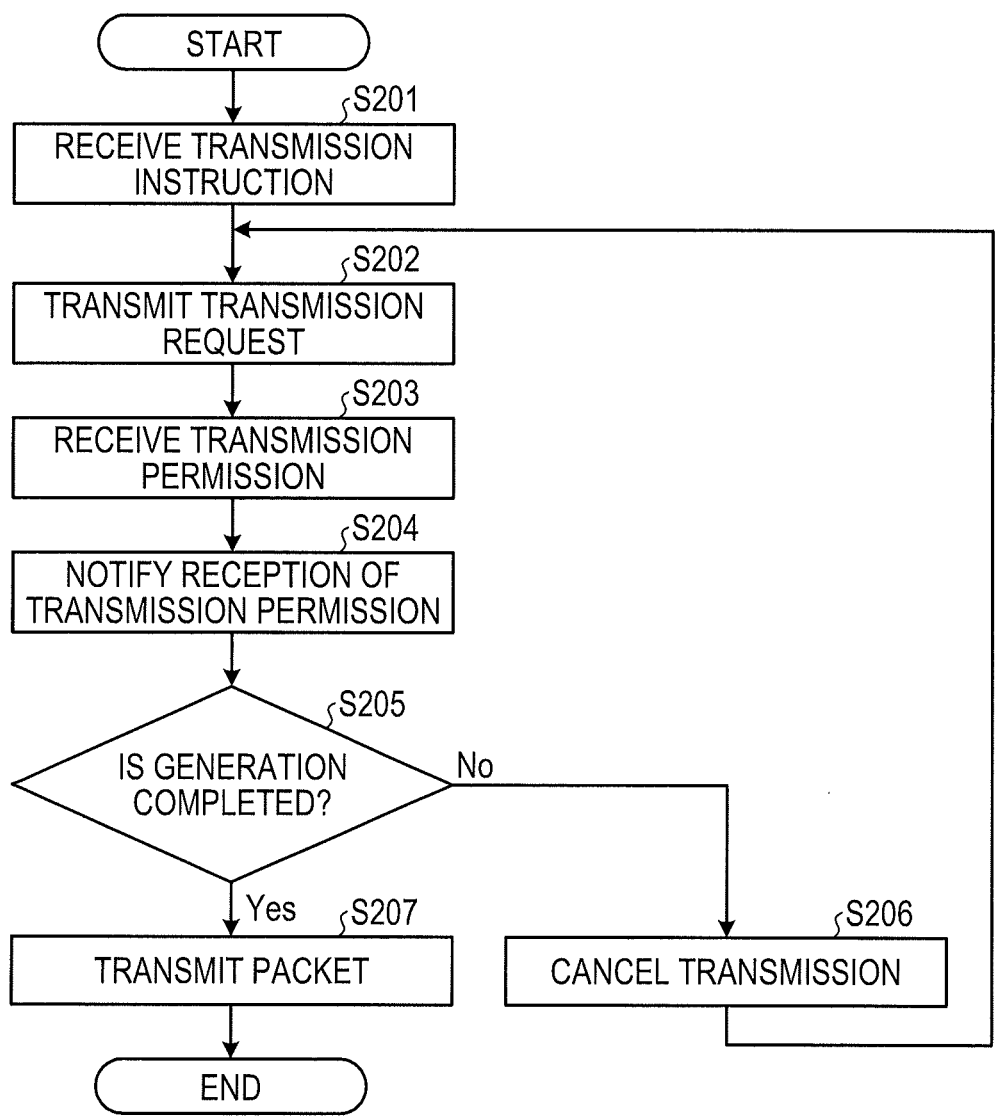
FIG. 6 is a flowchart of a packet transmission process.

Next, descriptions will be made on a flow of a packet transmission process by the packet transmission unit 134 with reference to FIG. 6. FIG. 6 is a flowchart of a packet transmission process.

The packet transmission unit 134 receives, from the DMA managing unit 331, a transmission instruction to transmit a packet (S201).

The packet transmission unit 134 transmits a packet transmission request to a destination port of the switch 20 (S202).

The packet transmission unit 134 receives a transmission permission from the switch 20 as a reply to the packet transmission request (S203).

The packet transmission unit 134 notifies the generation number control unit 332 of the reception of the transmission permission (S204).

The packet transmission unit 134 determines whether generation of a packet corresponding to the received transmission permission is completed (S205). When it is determined that generation of the packet is not completed ("NO" at S205), the packet transmission unit 134 cancels the transmission instruction corresponding to the received transmission permission (S206). Further, the packet transmission unit 134 transmits a transmission cancellation to the generation number control unit 332. Thereafter, the process performed by the packet transmission unit 134 goes back to S202.

In contrast, when it is determined that generation of the packet is completed ("YES" at S205), the packet transmission unit 134 transmits the packet corresponding to the received transmission permission to a destination port of the switch 20 (S207).

As described above, the network interface according to the first embodiment and the information processing apparatus equipped with the network interface limit the number of packets to be generated in a case where it takes a time until the packet transmission to the switch is started. That is, the number of packets to be generated is limited in a case where clogging occurs in the destination port. Accordingly, the performance deterioration due to the clogging of the destination port may be reduced.

Second Embodiment

Figure 7:
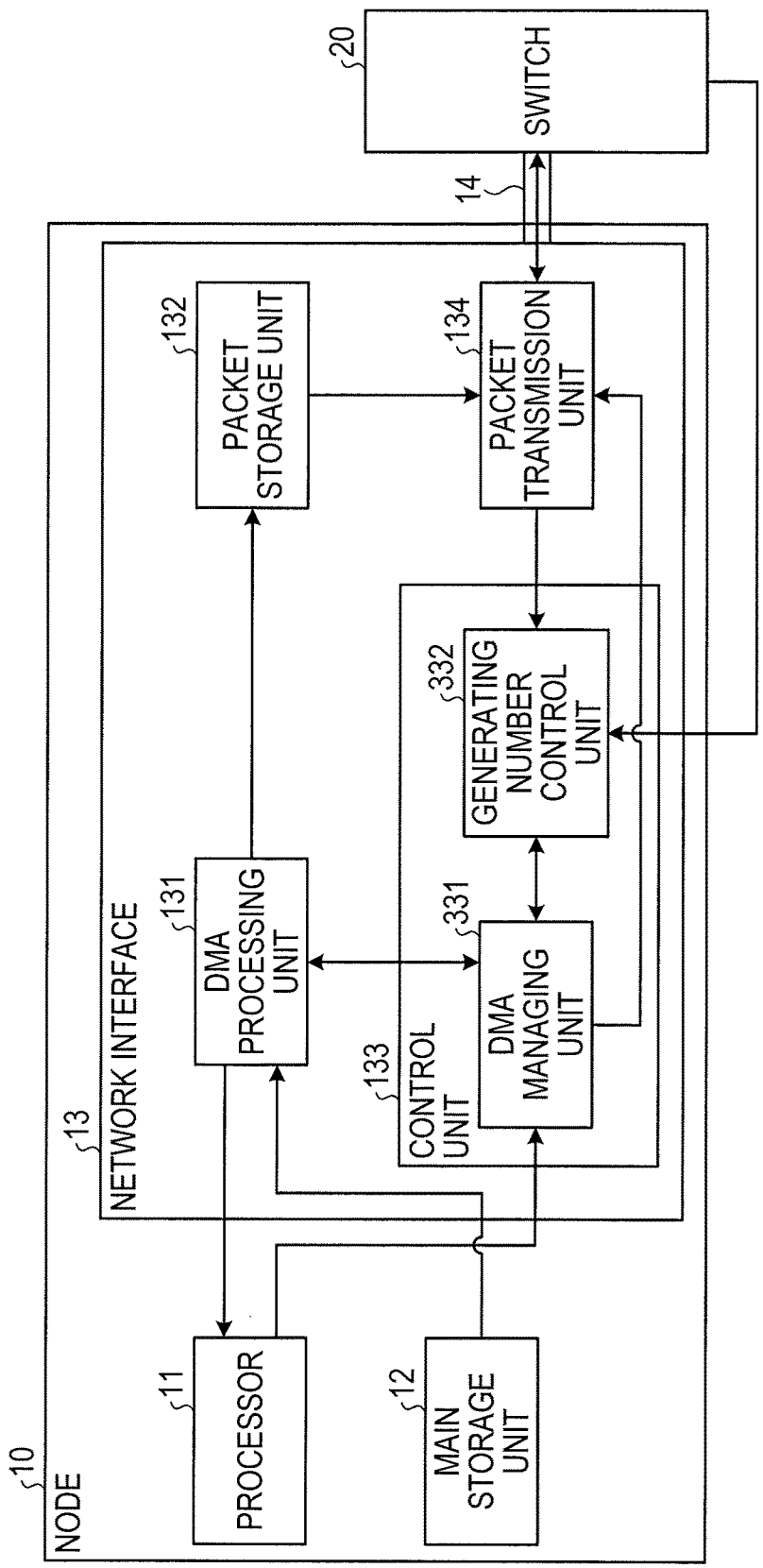
FIG. 7 is a diagram illustrating an information processing apparatus according to a second embodiment.

FIG. 7 is a diagram illustrating an information processing apparatus according to a second embodiment. The network interface 13 according to the second embodiment is different from the first embodiment in that the network interface 13 determines the state of a network on the basis of a buffer use rate and a packet transmission time of the switch 20. In the following, descriptions on a similar function of each unit as that of the first embodiment will be omitted.

The generation number control unit 332 receives, from a switch 20 to which a packet corresponding to a transmission instruction is to be transmitted, a packet transmission time and a buffer use rate of the buffer 201 (see FIG. 1) of a destination port of the switch 20. Here, the packet transmission time is a period of time between a timing at which the packet is transmitted to the destination port and a timing at which the packet is transmitted from the destination port. The buffer use rate and the packet transmission time of the destination port of the switch 20 correspond to an example of a "state of a network".

The generation number control unit 332 determines whether the buffer use rate of the buffer 201 of the destination port is 100%. When it is determined that the buffer use rate of the buffer 201 of the destination port is not 100%, the generation number control unit 332 determines that the number of packets to be generated is not to be limited. If the number of packets to be generated is limited, the generation number control unit 332 notifies the DMA managing unit 331 of cancellation of the limitation.

In contrast, when it is determined that the use rate of the buffer 201 of the destination port is 100%, the generation number control unit 332 determines whether the packet transmission time is equal to or greater than the predetermined packet generation time. When it is determined that the packet transmission time is equal to or greater than the predetermined packet generation time, the generation number control unit 332 notifies the DMA managing unit 331 of the fact that the number of packets to be generated is to be limited. In contrast, when it is determined that the packet transmission time is less than the predetermined packet generation time, the generation number control unit 332 determines that the number of packets to be generated is not to be limited. If the number of packets to be generated is limited, the generation number control unit 332 notifies the DMA managing unit 331 of cancellation of the limitation.

The switch 20 monitors the use rate of the buffer 201 of each of its own ports and the packet transmission time thereof. When the packet transmission request is received from the packet transmission unit 134, the switch 20 acquires the use rate of the buffer 201 and the packet transmission time of the destination port to which a packet to be transmitted. The switch 20 transmits the use rate and the packet transmission time of the buffer 201 of the destination port to the generation number control unit 332.

Figure 8:
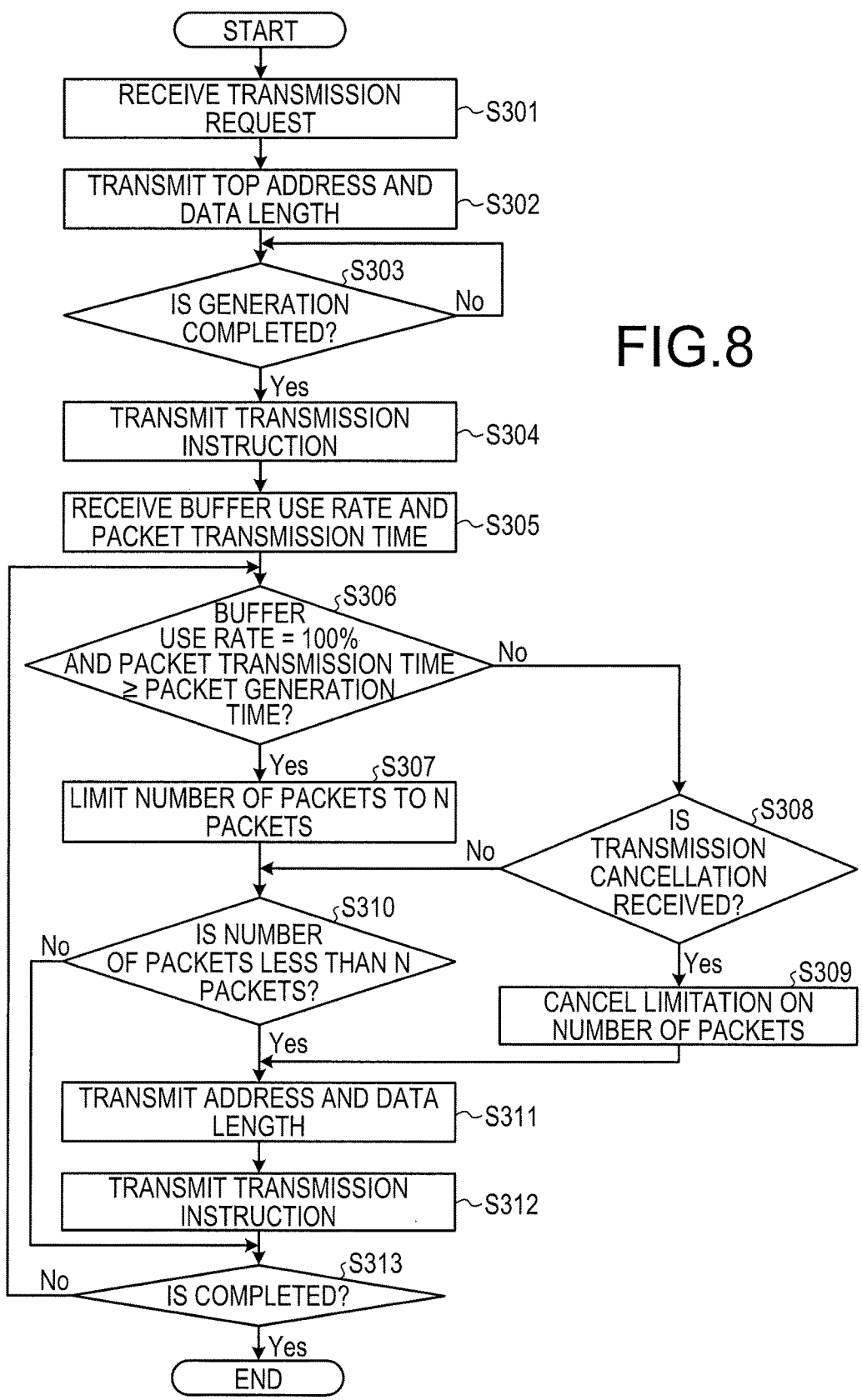
FIG. 8 is a flowchart of a control process of packet generation by a network interface according to a second embodiment.

Next, descriptions will be made on a control flow of packet generation by the network interface 13 according to the present embodiment with reference to FIG. 8. FIG. 8 is a flowchart of a control of packet generation by a network interface according to the second embodiment.

The DMA managing unit 331 receives a message transmission request from the processor 11 (S301). The DMA managing unit 331 calculates top addresses and data lengths of data to be stored in the leading packet and each of the subsequent packets succeeding to the leading packet in order to divide the data designated by the message transmission request into small-sized data that may be stored in each packet.

Next, the DMA managing unit 331 transmits the top address and data length of the data to be contained in the leading packet to the DMA processing unit 131 (S302).

The DMA managing unit 331 determines whether the generation of the leading packet is completed by a notification sent from the DMA processing unit 131 (S303). When it is determined that the generation of the leading packet is not completed ("NO" at S303), the DMA managing unit 331 waits until the generation of the leading packet is completed.

In contrast, when it is determined that the generation of the leading packet is completed ("YES" at S303), the DMA managing unit 331 transmits a transmission instruction to transmit the leading packet to the packet transmission unit 134 (S304).

The generation number control unit 332 receives, from the switch 20 to which a packet corresponding to the transmission instruction is transmitted, the use rate of the buffer 201 of the destination port of the switch 20 and the packet transmission time thereof (S305).

The generation number control unit 332 determines whether the use rate of the buffer 201 is 100% and the packet transmission time of the destination port is equal to or greater than the predetermined packet generation time (S306). When it is determined that the use rate of the buffer 201 is 100% and the packet transmission time of the destination port is equal to or greater than the predetermined packet generation time ("YES" at S306), the generation number control unit 332 notifies the DMA managing unit 331 of the fact that the number of packets to be generated is to be limited to N packets. The DMA managing unit 331 receives the notification and limits the number of packets to be generated to the N packets (S307).

In contrast, when it is determined that the use rate of the buffer 201 of the destination port is less than 100% or the packet transmission time of the destination port is less than the predetermined packet generation time ("NO" at S306), the generation number control unit 332 determines whether a transmission cancellation is received from the packet transmission unit 134 (S308). When it is determined that the transmission cancellation is not received ("NO" at S308), the packet generation process proceeds to S310.

In contrast, when it is determined that the transmission cancellation is received ("YES" at S308), the generation number control unit 332 notifies the DMA managing unit 331 of the cancellation of the limitation. The DMA managing unit 331 receives the notification and cancels the limitation on the number of packets to be generated (S309). Thereafter, the packet generation process proceeds to S311.

The DMA managing unit 331 determines whether the number of packets being generated is less than the N packets (S310). When it is determined that the number of packets being generated is the N packets ("NO" at S310), the processing performed by the DMA managing unit 331 proceeds to S313.

In contrast, when it is determined that the number of packets being generated is less than the N packets ("YES" at S310), the DMA managing unit 331 transmits an address and a data length of the data to be contained in the subsequent packet to the DMA processing unit 131 (S311).

Next, the DMA managing unit 331 transmits, to the packet transmission unit 134, a transmission instruction to transmit the subsequent packet (S312). Further, the DMA managing unit 331 notifies the generation number control unit 332 of the output of the transmission instruction.

The DMA managing unit 331 determines whether transmission instructions for all the packets are transmitted to the packet transmission unit 134 (S313). When it is determined that a packet for which a transmission instruction is not made remains ("NO" at S313), the packet generation process goes back to S306. In contrast, when it is determined that the transmission instructions for all the packets are transmitted ("YES" at S313), the DMA managing unit 331 ends the packet generation process.

As described above, the network interface according to the second embodiment determines the state of the network and decides whether to limit the number of packets to be generated on the basis of the buffer use rate and the packet transmission time. It is possible to determine whether to limit the number of packets to be generated using any information which is capable of determining the state of the network connecting the network interface which transmits the packet with a transmission destination. Accordingly, a method of determining whether to limit the number of packets to be generated may be changed depending on available information and a flexible operation suitable for a system may be performed.

Figure 9:
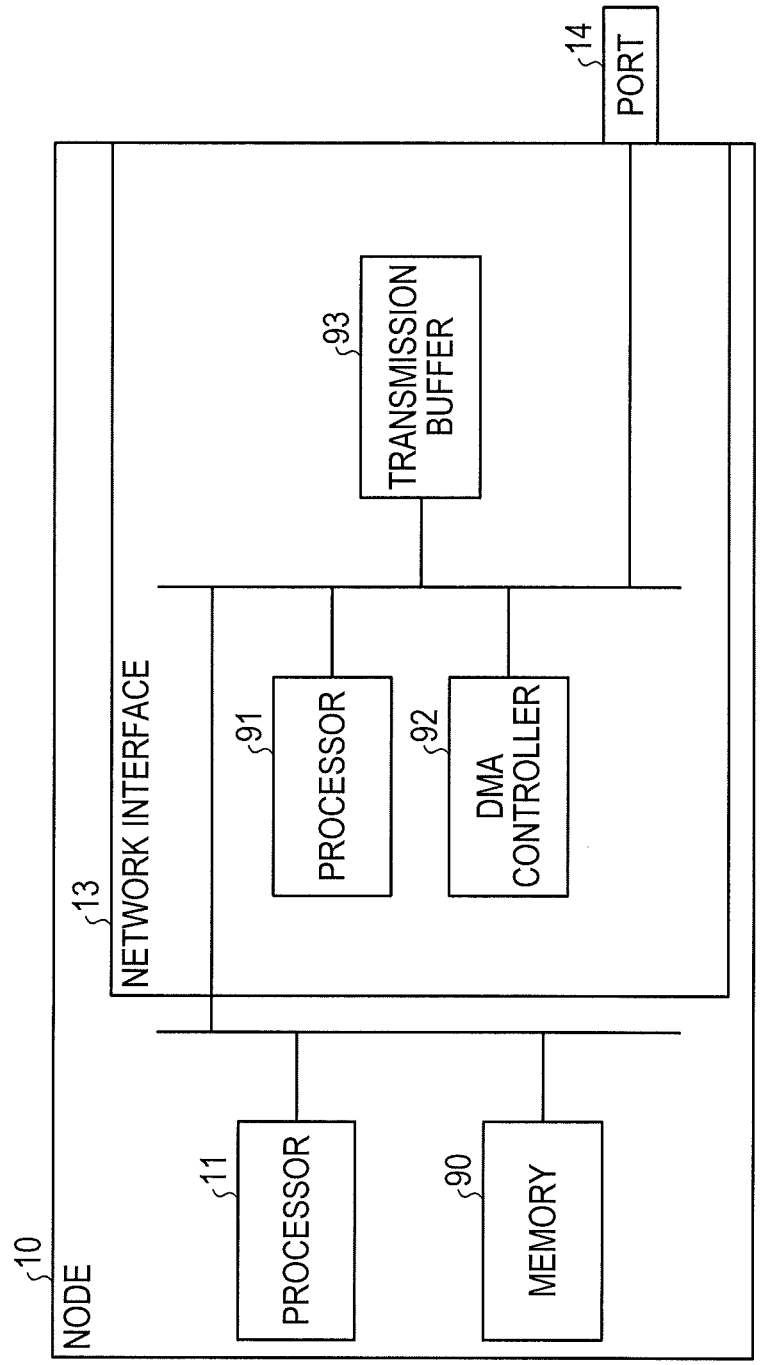
FIG. 9 is a diagram illustrating an exemplary hardware configuration of an information processing apparatus.

Next, descriptions will be made on a hardware configuration of the network interface according to each embodiment with reference to FIG. 9. FIG. 9 is a diagram illustrating an exemplary hardware configuration of the information processing apparatus.

As illustrated in FIG. 9, the network interface 13 includes a processor 91, a DMA controller 92, and a transmission buffer 93.

The processor 91 is connected with the DMA controller 92 and the transmission buffer 93 through a bus. The bus connecting the processor 91, the DMA controller 92, and the transmission buffer 93 is connected with a bus connecting the main processor 11 and the memory 90 of the node 10. Further, the bus connecting the processor 91, the DMA controller 92, and the transmission buffer 93 is connected to the port 14.

The memory 90 implements the function of, for example, the main storage unit 12 illustrated in FIG. 2.

The processor 91 implements the function of the control unit 133 including the DMA managing unit 331 and the generation number control unit 332, and the function of the packet transmission unit 134 illustrated in FIG. 2.

The transmission buffer 93 implements the function of the packet storage unit 132 illustrated in FIG. 2. The DMA controller 92 implements the function of the DMA processing unit 131 illustrated in FIG. 2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus, comprising:
a connection port connected to a switch apparatus; and
a processor configured to
acquire data to be transmitted on a network,
generate a packet containing the data,
acquire a state of the network to which the connection port is connected,
store the packet in a buffer based on the state of the network,
transmit the packet stored in the buffer to the switch apparatus via the connection port based on the state of the network,
control, on a basis of the state of the network and a predetermined packet generation time, a number of packets to be generated, and
acquire, as the state of the network, a use rate of a transmission buffer of a transmission port of the switch apparatus and a transmission time, the transmission port being connected to the network, the transmission time being a period of time between a timing at which the transmission port receives the packet and a timing at which the transmission port transmits the packet.

2. The communication apparatus according to claim 1, wherein the processor is configured to
transmit a transmission request for the packet to the switch apparatus,
receive a transmission permission transmitted from the switch apparatus in response to the transmission request,
acquire a permission time as the state of the network, the permission time including a period of time between a timing at which the transmission request is transmitted and a timing at which the transmission permission is received.

3. The communication apparatus according to claim 2, wherein the processor is configured to
limit, when the permission time is equal to or greater than the predetermined packet generation time, the number of packets to be generated.

4. The communication apparatus according to claim 3, wherein the processor is configured to
cancel, if generation of the packet is not completed when the transmission permission is received, the limitation on the number of packets to be generated.

5. The communication apparatus according to claim 1, wherein the processor is configured to
limit, when the use rate is 100% and the transmission time is greater than or equal to the predetermined packet generation time, the number of packets to be generated.

6. An information processing apparatus, comprising:
a first processor;
a memory device; and
a communication apparatus including:
a connection port connected to a switch apparatus, and
a second processor configured to
receive a message transmission request from the first processor, the message transmission request requesting transmission of first data stored in the memory device on a network,
acquire second data to be transmitted on the network, the second data being a part of the first data,
generate a packet containing the second data,
acquire a state of the network to which the connection port is connected, store the packet in a buffer based on the state of the network, transmit the packet stored in the buffer to the switch apparatus via the connection port based on the state of the network, and control, on a basis of the state of the network and a predetermined packet generation time, a number of packets to be generated, and acquire, as the state of the network, a use rate of a transmission buffer of a transmission port of the switch apparatus and a transmission time, the transmission port being connected to the network, the transmission time being a period of time between a timing at which the transmission port receives the packet and a timing at which the transmission port transmits the packet.

7. A method of controlling a communication apparatus, the method comprising:

acquiring, by a computer, data to be transmitted on a network;

generating a packet containing the data;

acquiring a state of the network to which a connection port is connected;

storing the packet in a buffer based on the state of the network;

transmitting the packet stored in the buffer to a switch apparatus via the connection port based on the state of the network;

controlling, on a basis of the state of the network and a predetermined packet generation time, a number of packets to be generated; and acquire, as the state of the network, a use rate of a transmission buffer of a transmission port of the switch apparatus and a transmission time, the transmission port being connected to the network, the transmission time being a period of time between a timing at which the transmission port receives the packet and a timing at which the transmission port transmits the packet.

* * * * *